US006188889B1

(12) United States Patent
Tsai

(10) Patent No.: US 6,188,889 B1
(45) Date of Patent: Feb. 13, 2001

(54) RADIO TRANSMITTER WITH LEARNING FUNCTION, AND THE RELATED CONTROL METHOD

(76) Inventor: Shyi-Tong Tsai, No. 91, Ta-Chou St., Taichung City (TW)

( * ) Notice: Under 35 U.S.C. 154(b), the term of this patent shall be extended for 0 days.

(21) Appl. No.: 09/153,047

(22) Filed: Sep. 15, 1998

(51) Int. Cl.[7] .............................. H04M 3/00; G08C 19/00

(52) U.S. Cl. .................... 455/420; 341/176; 340/825.69; 340/825.72; 348/734; 359/142; 455/92; 455/352

(58) Field of Search .............................. 455/420, 92, 352, 455/353, 355; 341/176; 340/825.69, 825.72, 825.24, 825.25, 825.22; 348/734; 359/142

(56) References Cited

U.S. PATENT DOCUMENTS

| | | | | |
|---|---|---|---|---|
| 4,623,887 | * | 11/1986 | Welles, II | 340/825.69 |
| 4,626,848 | * | 12/1986 | Ehlers | 340/825.69 |
| 4,703,359 | * | 10/1987 | Rumbolt et al. | 340/825.69 |
| 4,959,810 | * | 9/1990 | Darbee et al. | 340/825.69 |
| 5,442,340 | * | 8/1995 | Dykema | 341/176 |
| 5,661,804 | * | 8/1997 | Dykema et al. | 380/274 |
| 5,686,903 | * | 11/1997 | Duckworth et al. | 340/825.69 |
| 5,699,054 | * | 12/1997 | Duckworth | 340/825.69 |
| 5,699,055 | * | 12/1997 | Dykema et al. | 340/825.69 |
| 5,854,593 | * | 12/1998 | Dykema et al. | 340/825.69 |
| 5,959,751 | * | 9/1999 | Darbee et al. | 359/148 |
| 5,963,624 | * | 10/1999 | Pope | 455/420 |
| 6,005,508 | * | 12/1999 | Tsui | 341/176 |
| 6,014,092 | * | 1/2000 | Darbee et al. | 341/176 |
| 6,020,829 | * | 2/2000 | Hörmann | 341/176 |

* cited by examiner

*Primary Examiner*—Fan Tsang
*Assistant Examiner*—Rafael Perez-Gutierrez
(74) *Attorney, Agent, or Firm*—Rosenberg, Klein & Lee

(57) ABSTRACT

A radio transmitter includes a high frequency circuit for modulation and transmitting during a remote transmitting mode and for receiving and demodulation during a receiving learning mode, a LED indicator connected in series between the high frequency circuit and the power supply for transmitting indication and tuning indication, a single chip microcomputer for identification code checking and code encoding control, and a memory (EEPROM) for data storage.

4 Claims, 1 Drawing Sheet

RADIO TRANSMITTER WITH LEARNING FUNCTION, AND THE RELATED CONTROL METHOD

BACKGROUND OF THE INVENTION

The present invention relates to an improved structure of radio transmitter, and more particularly to such a radio transmitter which provides a learning function for duplicating other radio transmitters.

The base principle of the control of a remote controller is as follows: the transmitter produces a particular serial code subject to the setting of a set of key switches, the serial code is then transmitted to a remote receiver by means of a carrier medium (for example, infrared or radio) and then decoded by the receiver for operation control. Regular commercially available radio transmitters have no learning function. Therefore, if a person has three different radio remote control systems, three different transmitters are needed. Providing an infrared remote control system with a learning function can easily be achieved by installing a microcomputer capable of reading and memorizing encoding signal of other transmitters in the transmitter of the infrared remote control system and adding an infrared receiving element in the receiver of the infrared remote control system. However, it is difficult to provide a radio remote control system with a learning function because the signal encoding procedure is complicated and an identification code must be added for identification. A signal can be transmitted through the transmitter of a radio remote control system only when it is modulated by a high frequency carrier wave. Therefore, a transmitter with a learning function must have a radio receiving demodulating circuit. However, when learning, the frequency of the radio receiving demodulating circuit must be adjusted by an instrument. The transmitter of a radio remote control system generally comprises an encoder having pins at the data line thereof, and a set of control buttons respectively connected to the pins of the data line of the encoder, each control button define a particular control code, which determines the control function of the transmitter, and setting switch for example a DIP switch for setting an identification code. When power supply is connected, the encoder provides a serial code subject to the setting of the control buttons. In an infrared remote control system, the transmitter provides only function code but not identification code, and serial code directly drives an infrared diode to transmit the signal. In a radio remote control system, serial code is connected to a modulation and radio transmitting circuit.

SUMMARY OF THE INVENTION

The present invention has been accomplished to provide a radio transmitter for a radio remote control system which has a learning function for duplication of other transmitters for use in different radio remote control systems. The learning function enables the user to combine the transmitters of different radio remote control systems (garage remote control system, community gate remote control system, automobile remote control alarm system, home remote control alarm system) into a unit, so that one radio transmitter can be used to control a set of radio remote control systems. According to the present invention, the radio transmitter comprises a single chip microcomputer which controls the operation of the radio transmitter, enabling the radio transmitter to provide a receiving learning mode and a remote control transmitting mode, the single chip microcomputer having a set of input terminals and a set of output terminals; memory means for example EEPROM controlled by the single chip microcomputer to receive encoding data from the single chip microcomputer when the radio transmitter is set into the receiving learning mode, or to output stored data to the single chip microcomputer when the radio transmitter is set into the remote control transmitting mode; a function control key pad, the function control key pad comprising a set of key switches respectively connected to the input terminals of the single chip microcomputer and set by the user to provide a set of combinations for different function controls; a mode selector switch connected to one input terminal of the single chip microcomputer for selection between said receiving learning mode and the remote control transmitting mode; an encoding signal input circuit, the encoding signal input circuit comprising a transistor having the collector thereof connected to one input terminal of the single chip microcomputer for outputting encoding signal from the encoding signal input circuit to the single chip microcomputer; and a transceiver having an input terminal controlled by a serial code signal from the single chip microcomputer and an output terminal connected to the base of the transistor of the encoding signal circuit. When the receiving learning mode is selected, the single chip microcomputer reads in encoding signal from the transistor of the encoding signal input circuit and stores it in an address in the memory means subject to the setting of the key switches of the key pad. When the remote control transmitting mode is selected, the single chip microcomputer fetches encoding signal from the memory means subject to the setting of the key switches of the key pad and outputs fetched encoding signal to the transceiver for transmitting into the air. The invention also provides a method of duplicating a master transmitter from a transmitter to be duplicated through the receiving learning mode and then driving the master transmitter to transmit signal by remote control. The method comprises the first step of moving the master transmitter close to the transmitter to be duplicated when set in the receiving learning mode, then operating the master transmitter to transmit a signal, and then adjust the transceiver of the master transmitter, enabling the intensity of light of the LED indicator of the tuning indication circuit of the master transmitter to reach the maximum level, the second step of switching the mode selector switch of the master transmitter to the position of the receiving learning mode, enabling the single chip microcomputer to read in series encoding signal from the transistor of the encoding signal input circuit, the third step of enabling the single chip microcomputer to store received series encoding signal in the corresponding address in the memory means subject to the setting of the set of key switches of the key pad, and the fourth step of switching the mode selector switch of the master transmitter to the remote control transmitting mode, enabling the single chip microcomputer to fetch corresponding serial code from the memory means subject to the setting of the key switches of the key pad and then to send fetched serial code through the transceiver for transmitting into the air.

DETAILED DESCRIPTION OF THE PREFERRED EMBODIMENT

Figure 1:
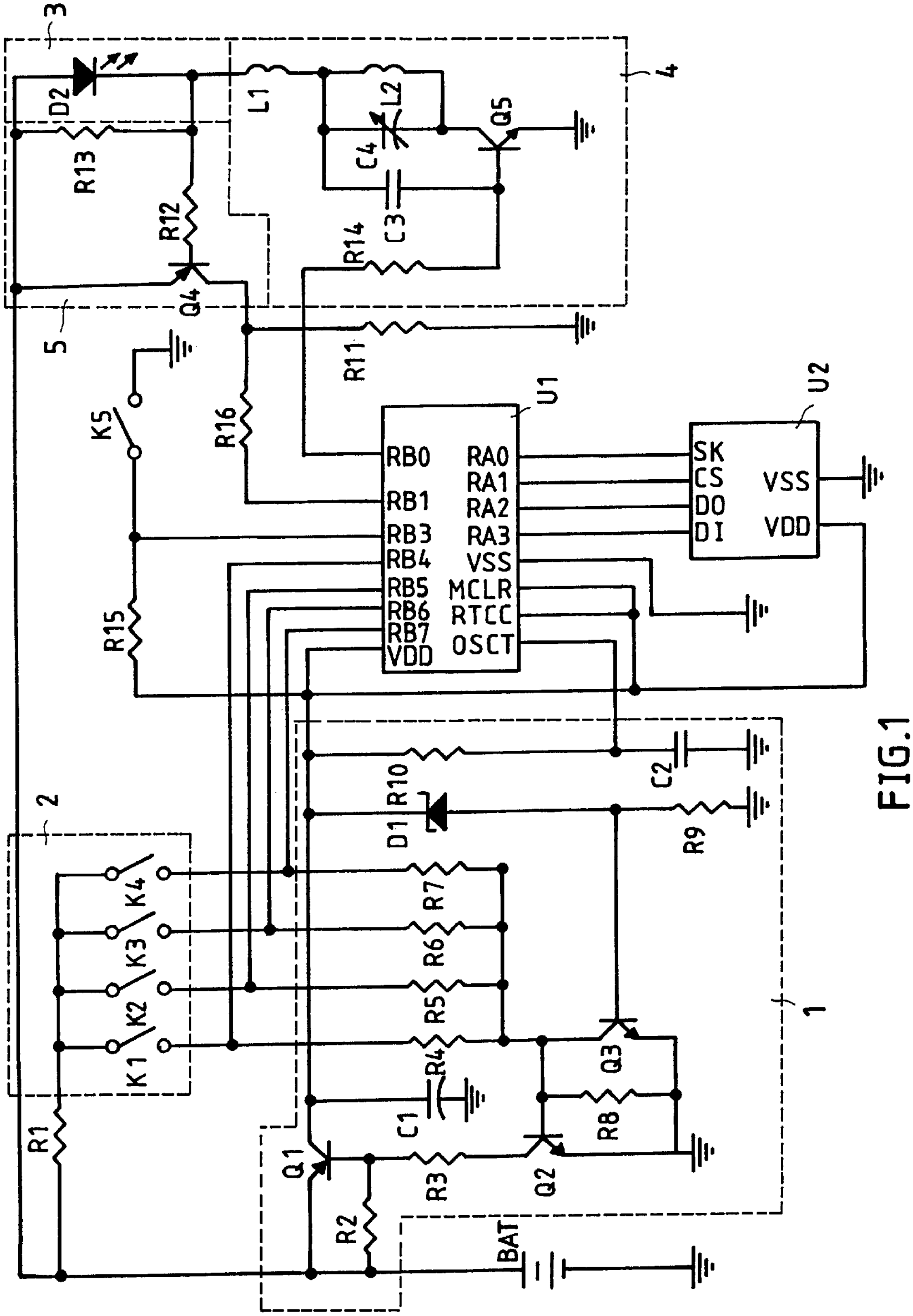
FIG. 1 is a circuit diagram of a radio transmitter according to the present invention.

Referring to FIG. 1, a radio transmitter in accordance with the present invention comprises a power supply circuit 1, a function control key pad 2, a tuning indication circuit 3, a transceiver 4, an encoding signal input circuit 5, a single chip microcomputer U1, a memory U2, and a mode selector switch K5.

The power supply circuit 1 is comprised of transistors Q1~Q3, resistors R2~R10, capacitor C1, capacitor C2 and zener diode D1, and provides 5V voltage output to VDD of the single chip microcomputer U1. The whole transmitter uses a 12V battery BAT to provide the necessary working voltage.

The function control key pad 2 comprises a set of key switches K1~K4. Key switches K1~K4 can be of any type of key switches (for example, tact switches), each having a common end connected in series to the positive terminal of the battery BAT through a resistor R1. The opposite ends of key switches K1~K4 are respectively connected to transistor Q2 through respective resistors R4~R7 to provide a bias voltage to transistor Q2, enabling power supply circuit 1 to work. Key switches K1~K4 are also respectively connected to input terminals RB4,RB5,RB6,RB7 of the single chip microcomputer U1 for function selection control. The function control key pad 2 provides total 15 control functions ($2^4$=16, the status where K1~K4 are all in open circuit state must be deducted from 16, therefore there are total 15 control functions).

Normally, the transmitter does no consume power supply. 5V power supply is provided to the single chip microcomputer U1 only when one of key switches K1~K4 is depressed.

The mode selector switch K5 is connected to input terminal RB3 of the single chip microcomputer U1 for controlling the operation of the single chip microcomputer U1 between the receiving learning mode and the transmitting mode.

When the receiving learning mode is selected, the single chip microcomputer U1 reads encoding signal from the encoding signal input circuit 5 into input terminal RB1 thereof, and then stores received encoding signal in the memory U2. Encoding signal is obtained from the encoding signal input circuit 5 subject to the combination of the status of key switches K1~K4. The encoding signal input circuit 5 is comprised of resistor R16, transistor Q4, and resistors R12,R13.

When the remote control transmitting mode is selected, the single chip microcomputer controls the combinations of key switches of the function control key pad 2, and fetches stored encoding signal from a particular address in the memory U2, then outputs fetched encoding signal through output terminal RB0 thereof to resistor R14 of the transceiver 4, causing control transistor Q5 of the transceiver 4 to transmit signal.

The memory U2 is for storing data. When the receiving learning mode is selected, encoded data from the single chip microcomputer U1 is stored in the memory U2. When the remote control transmitting mode is selected, stored data is provided by the memory U2 to the single chip microcomputer U1.

The tuning indication circuit 3 comprises a LED indicator D2. The positive terminal of the LED indicator D2 is connected to the positive terminal of the battery BAT. The negative terminal of the LED indicator D2 is connected to the base of transistor Q4 of the encoding signal input circuit 5. The LED indicator D2 is turned on to indicate the transmitting of signal when in the remote control transmitting mode. The light intensity of the LED indicator D2 varies with the value of electric current at the collector of transistor Q5 for indication of tuning when in the learning mode.

The transceiver 4 provides the function of modulating and transmitting signal as well as the function of receiving and demodulating signal, and is comprised of transistor Q5, first coil L1, second coil L2, capacitor C3, variable capacitor C4, and resistor R14. First coil L1 is a choking coil having one end connected to the negative terminal of indicator D2 of the tuning indication circuit 3, and an opposite end connected in series to second coil L2. Resistor R14 has one end for controlling the base of transistor Q5, and an opposite end connected to one output terminal RB0 of the single chip microcomputer U1 for receiving series encoding signal. When in the remote control transmitting mode, series encoding signal is sent from the single chip microcomputer U1 through resistor R14 to the base of transistor Q5, causing second coil L2 to control the oscillation transmitting operation of variable capacitor C4. Capacitor C3 is for oscillation feedback.

When in the learning mode, the transmitter to be duplicated is disposed close to the master transmitter of the present invention, causing an induction signal to be induced by second coil L2. When an induction signal is induced by second coil L2, it is immediately sent by second coil L2 through capacitor C3 to the base of transistor Q5, causing the variable capacitor C4 to determine its resonance frequency. When the transmitting frequency of the duplicated transmitter matches, the amplitude reaches the maximum level, and the maximum collector current is obtained at transistor Q5. In the circuit, LED indicator D2 and the collector of transistor Q5 are connected in series, and collector current of transistor Q5 passes through LED indicator D2. When in the receiving learning mode, the intensity of light of LED indicator D2 varies with the value of collector current at transistor Q5 for tuning indication. By adjusting second coil L2, the resonance frequency of variable capacitor C4 is adjusted. When electric current passes through LED indicator D2, a 1.6 voltage drop occurs, and the voltage drop is then amplified by transistor Q4 of the encoding signal input circuit 5, and a complete receiving demodulating circuit is thus formed, therefore encoding signal of the duplicated transmitter is sent from the collector of transistor Q4 through current limit resistor R16 to the single chip microcomputer U1.

When the present invention is in use, the receiving learning mode is firstly started so as to duplicate a master transmitter from a transmitter to be duplicated, then the remote control transmitting mode is operated. The procedure is outlined hereinafter:

1. When in the receiving learning mode, the master transmitter is moved close to the transmitter to be duplicated, then the master transmitter is operated to transmit a signal, and then adjust variable capacitor C4 of the transceiver 4 of the master transmitter, enabling the intensity of light of LED indicator D2 of the tuning indication circuit 3 to reach the maximum level. When the maximum light intensity is achieved, it means that the frequency of the master transmitter matches the frequency of the transmitter to be duplicated.
2. Mode selector switch K5 is switched to the position of the receiving learning mode (for example the close-circuit position), enabling the single chip microcomputer U1 to read in series encoding signal from transistor Q4 of the encoding signal input circuit 5.
3. The single chip microcomputer U1 stores received series encoding signal in the memory U2 subject to the setting of the set of key switches K1~K4. For example, control function 1 is K1, control function 2 is K2, control function 3 is K1+K2.

4. When in the remote control transmitting mode: mode selector switch K5 is switched to the remote control transmitting position (for example the open-circuit position), enabling the single chip microcomputer U1 to fetch corresponding serial code from the memory U2 subject to the set combination of key switches K1~K4.
5. The single chip microcomputer U1 sends fetched serial code through resistor R14 of the transceiver 4 to transistor Q5, enabling it to be transmitted into the air.

Therefore, a transmitter with stored signal can be duplicated to a blank transmitter according to the aforesaid procedure.

What the invention claimed is:

1. A radio transmitter comprising:

a single chip microcomputer which controls the operation of the radio transmitter, enabling the radio transmitter to provide a receiving learning mode and a remote control transmitting mode, said single chip microcomputer having a set of input terminals and a set of output terminals;

memory means controlled by said single chip microcomputer to receive encoding data from said single chip microcomputer when the radio transmitter is set into the receiving learning mode, or to output stored data to said single chip microcomputer when the radio transmitter is set into the remote control transmitting mode;

a function control key pad, said function control key pad comprising a set of key switches respectively connected to the input terminals of said single chip microcomputer and set by the user to provide a set of combinations for different function controls;

a mode selector switch connected to one input terminal of said single chip microcomputer for selection between said receiving learning mode and said remote control transmitting mode;

an encoding signal input circuit, said encoding signal input circuit comprising a transistor having the collector thereof connected to one input terminal of said single chip microcomputer for outputting an encoding signal from said encoding signal input circuit to said single chip microcomputer; and a transceiver operable in the RF frequency range having an input terminal controlled by a serial code signal from said single chip microcomputer and an output terminal connected to the base of the transistor of said encoding signal circuit;

wherein when the receiving learning mode is selected, said single chip microcomputer reads in an encoding signal from the transistor of said encoding signal input circuit and stores it in an address in said memory means subject to the setting of the key switches of said key pad; when the remote control transmitting mode is selected, said single chip microcomputer fetches said encoding signal from said memory means subject to the setting of the key switches of said key pad and outputs said fetched encoding signal to said transceiver for external transmission.

2. A radio transmitter comprising:

a single chip microcomputer which controls the operation of the radio transmitter, enabling the radio transmitter to provide a receiving learning mode and a remote control transmitting mode, said single chip microcomputer having a set of input terminals and a set of output terminals;

memory means controlled by said single chip microcomputer to receive encoding data from said single chip microcomputer when the radio transmitter is set into the receiving learning mode, or to output stored data to said single chip microcomputer when the radio transmitter is set into the remote control transmitting mode;

a function control key pad, said function control key pad comprising a set of key switches respectively connected to the input terminals of said single chip microcomputer and set by the user to provide a set of combinations for different function controls;

a mode selector switch connected to one input terminal of said single chip microcomputer for selection between said receiving learning mode and said remote control transmitting mode;

an encoding signal input circuit, said encoding signal input circuit comprising a transistor having the collector thereof connected to one input terminal of said single chip microcomputer for outputting an encoding signal from said encoding signal input circuit to said single chip microcomputer;

a transceiver having an output terminal controlled by a serial code signal from said single chip microcomputer and an output terminal connected to the base of the transistor of said encoding signal circuit, said transceiver comprising a choking coil; and a tuning indication circuit for tuning indication, said tuning indication circuit comprising a LED (light emitting diode) indicator having a positive terminal connected to the positive terminal of a power supply and a negative terminal connected to the choking coil of said transceiver;

wherein when the receiving learning mode is selected, said single chip microcomputer reads in an encoding signal from the transistor of said encoding signal input circuit and stores it in an address in said memory means subject to the setting of the key switches of said key pad, and the intensity of light of the LED indicator of said tuning indication circuit varies with the value of the electric current at the collector of a transistor of said transceiver for tuning indication; when the remote control transmitting mode is selected, said single chip microcomputer fetches said encoding signal from said memory means subject to the setting of the key switches of said key pad and outputs said fetched encoding signal to said transceiver for external transmission, and the LED indicator of said tuning indication circuit is turned on to indicate the transmission of the signal.

3. A radio transmitter comprising:

a single chip microcomputer which controls the operation of the radio transmitter, enabling the radio transmitter to provide a receiving learning mode and a remote control transmitting mode, said single chip microcomputer having a set of input terminals and a set of output terminals;

memory means controlled by said single chip microcomputer to receive encoding data from said single chip microcomputer when the radio transmitter is set into the receiving learning mode, or to output stored data to said single chip microcomputer when the radio transmitter is set into the remote control transmitting mode;

a function control key pad, said function control key pad comprising a set of key switches respectively connected to the input terminals of said single chip microcomputer and set by the user to provide a set of combinations for different function controls;

a mode selector switch connected to one input terminal of said single chip microcomputer for selection between said receiving learning mode and said remote control transmitting mode;

an encoding signal input circuit, said encoding signal input circuit comprising a transistor having the collector thereof connected to one input terminal of said single chip microcomputer for outputting an encoding signal from said encoding signal input circuit to said single chip microcomputer; and a transceiver having an input terminal controlled by a serial code signal from said single chip microcomputer and an output terminal connected to the base of the transistor of said encoding signal circuit, said transceiver including a transistor, a first coil, a second coil, a capacitor, a variable capacitor, and a resistor, said first coil being a choking coil having one end connected to a negative terminal of the LED indicator of a tuning indication circuit and an opposite end connected in series to said second coil, said resistor having one end for controlling the base of the transistor of said transceiver and an opposite end connected to one output terminal of said single chip microcomputer for receiving series of encoding signals, said capacitor being for oscillation feedbacks;

wherein when the receiving learning mode is selected, said single chip microcomputer reads in an encoding signal from the transistor of said encoding signal input circuit and stores it in an address in said memory means subject to the setting of the key switches of said key pad; when the remote control transmitting mode is selected, said single chip microcomputer fetches said encoding signal from said memory means subject to the setting of the key switches of said key pad and outputs said fetched encoding signal to said transceiver for external transmission.

4. A radio transmitter control method of duplicating a master transmitter from a transmitter to be duplicated through the receiving learning mode and then driving the master transmitter to transmit signal by remote control in a system wherein the master transmitter includes:

a single chip microcomputer which controls the operation of the radio transmitter, enabling the radio transmitter to provide a receiving learning mode and a remote control transmitting mode, said single chip microcomputer having a set of input terminals and a set of output terminals;

memory means controlled by said single chip microcomputer to receive encoding data from said single chip microcomputer when the radio transmitter is set into the receiving learning mode, or to output stored data to said single chip microcomputer when the radio transmitter is set into the remote control transmitting mode;

a function control key pad, said function control key pad comprising a set of key switches respectively connected to the input terminals of said single chip microcomputer and set by the user to provide a set of combinations for different function controls;

a mode selector switch connected to one input terminal of said single chip microcomputer for selection between said receiving learning mode and said remote control transmitting mode;

an encoding signal input circuit, said encoding signal input circuit comprising a transistor having the collector thereof connected to one input terminal of said single chip microcomputer for outputting an encoding signal from said encoding signal input circuit to said single chip microcomputer;

a transceiver having an input terminal controlled by a serial code signal from said single chip microcomputer and an output terminal connected to the base of the transistor of said encoding signal circuit;

wherein when the receiving learning mode is selected, said single chip microcomputer reads in an encoding signal from the transistor of said encoding signal input circuit and stores it in an address in said memory means subject to the setting of the key switches of said key pad; when the remote control transmitting mode is selected, said single chip microcomputer fetches said encoding signal from said memory means subject to the setting of the key switches of said key pad and outputs said fetched encoding signal to said transceiver for external transmission;

the method comprising the steps of:

i) moving the master transmitter close to the transmitter to be duplicated when set in the receiving learning mode, then operating the transmitter to be duplicated to transmit a signal, and then adjust the transceiver of the master transmitter, enabling the intensity of light of the LED indicator of the turning indication circuit of the master transmitter to reach the maximum level;

ii) switching the mode selector switch of the master transmitter to the position of the receiving learning mode, enabling the single chip microcomputer to read in series encoding signals from the transistor of the encoding signal input circuit;

iii) enabling the single chip microcomputer to store received series of encoding signals in the corresponding address in the memory means subject to the setting of the set of key switches of the key pad; and iv) switching the mode selector switch of the master transmitter to the remote control transmitting mode, enabling the single chip microcomputer to fetch corresponding serial code from the memory means subject to the setting of the key switches of the key pad and then to send said fetched serial code through the transceiver for external transmission.

* * * * *